(No Model.)

A. W. WALTER.
INSERTIBLE SAW TOOTH.

No. 542,577. Patented July 9, 1895.

WITNESSES.
C. J. Cross.
Eddie Smith

INVENTOR.
Anton W. Walter
By Fred W. Bond
Attorney.

UNITED STATES PATENT OFFICE.

ANTON W. WALTER, OF CANTON, OHIO, ASSIGNOR OF ONE-HALF TO CHARLES W. REAM, OF SAME PLACE.

INSERTIBLE SAW-TOOTH.

SPECIFICATION forming part of Letters Patent No. 542,577, dated July 9, 1895.

Application filed October 12, 1894. Serial No. 525,667. (No model.)

*To all whom it may concern:*

Be it known that I, ANTON W. WALTER, a citizen of the United States, residing at Canton, in the county of Stark and State of Ohio, have invented certain new and useful Improvements in Insertible Saw-Teeth; and I do hereby declare that the following is a full, clear, and exact description of the same, reference being had to the annexed drawings, making a part of this specification, and to the letters of reference marked thereon, in which—

Figure 1:
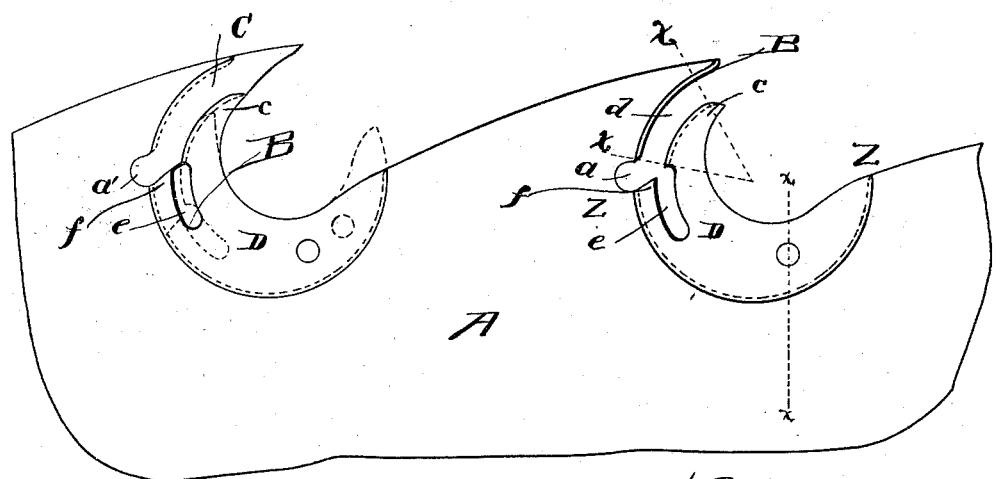
Figure 2:
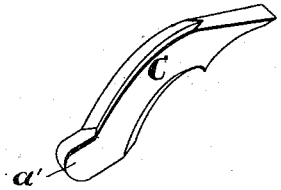
Figure 3:
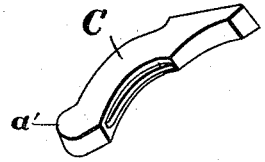
Figure 4:

Figure 1 is a view showing a portion of the saw-blade, illustrating a tooth placed in proper position and secured, also showing the tooth removed and illustrating the position of the lock and key with reference to the tooth. Figs. 2 and 3 are detached views of the tooth, showing the same in different positions. Fig. 4 is a transverse section through line $x$ $x$, Fig. 1.

The present invention has relation to insertible saw-teeth, and it consists in the peculiar construction and manner of locking the teeth hereinafter described and claimed.

Similar letters of reference indicate corresponding parts in all of the figures of the drawings.

In the accompanying drawings, A represents a portion of the saw-blade, showing two tooth-recesses formed in said blade.

The tooth and locking recess B is formed of the segment of a circle, and its edge is provided with either a V-shaped groove or ridge, as desired, for the purpose hereinafter described.

From the recess B leads the recess $a$, which recess is for the purpose of receiving the inner end of the tooth C. The tooth is substantially of the form shown, and, as shown, it is provided with the heel $a'$, which heel is located at an angle to the tooth proper, and is so located for the purpose of assisting in holding the tooth in proper position by means of the recess $a$.

The locking wedge or key D is substantially of the form shown in the drawings, and, as shown, the back of said wedge or key is formed of the segment of a circle from Z to Z, of the same diameter as that of the recess B, and is so formed for the purpose of adjusting said wedge or key in a circular path. The wedge or key D is provided with the segmental section $c$, which segmental section is formed of a circle less in diameter than the diameter of the circle forming the recess B.

The tooth C is formed of the segment of a circle from X to X, and is of somewhat greater size in cross-section than the width of the recess $d$, thereby providing a means for securely locking and holding the tooth C in proper position, as hereinafter described.

The wedge or key D is provided with the slot $e$, which slot is located substantially as shown in Fig. 1, and, as shown, said slot is open, thereby dividing the segmental section $c$ and the shoulder $f$.

In use the tooth C is first placed in the position illustrated in Fig. 1, which brings the angled portion $a'$ into the recess $a$, after which the key D is inserted upon the opposite side from that of the tooth C and moves in a circular path until the shoulder $f$ comes in contact with the tooth C, which brings the segmental section $c$ directly and firmly against the inner edge of the segmental portion of the tooth C, and inasmuch as the tooth is formed of greater width than the width of the space $d$, said tooth will be securely locked or bound.

By my peculiar manner of locking the tooth C the strain is distributed the entire length of the segmental section $c$, thereby preventing the saw-blade from buckling. Heretofore it has been customary to move the locking-keys in the same direction as the direction of the teeth; but by my peculiar arrangement the locking key D is moved in the opposite direction from that of the tooth, thereby enabling me to bring the shoulder $f$ under the tooth, and inasmuch as the tooth is held against longitudinal or circular movement by means of the heel $a'$ said shoulder is utilized to support the tooth in connection with the segmental section $c$.

Having fully described my invention, what I claim as new, and desire to secure by Letters Patent, is—

The combination of a saw-blade provided with a recess B and the recess $a$ said recess $a$ opening into the recess B, the tooth C, provided with the heel $a'$ and having a segmental section located between its heel and point, the locking key, adjustable in a circular path in an opposite direction from the longitudinal movement of the tooth, and provided with the slot $e$, the shoulder $f$ and the segmental section $c$, substantially as and for the purpose specified.

In testimony that I claim the above I have hereunto subscribed my name in the presence of two witnesses.

ANTON W. WALTER.

Witnesses:
 F. W. BOND,
 E. A. C. SMITH.